(12) United States Patent
Mao et al.

(10) Patent No.: US 12,107,944 B2
(45) Date of Patent: Oct. 1, 2024

(54) BLUETOOTH INTERNET PROTOCOL PACKET TRANSMITTING DEVICE AND METHOD

(71) Applicant: Realtek Semiconductor Corporation, Hsinchu (TW)

(72) Inventors: Weifeng Mao, Jiangsu Province (CN); Zhuwei Lu, Jiangsu Province (CN); Jidong Chen, Jiangsu Province (CN); Zuomin Li, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/173,072

(22) Filed: Feb. 23, 2023

(65) Prior Publication Data

US 2024/0015235 A1 Jan. 11, 2024

(30) Foreign Application Priority Data

Jul. 7, 2022 (CN) .......................... 202210802988.8

(51) Int. Cl.
*H04L 69/30* (2022.01)
*H04W 80/00* (2009.01)

(52) U.S. Cl.
CPC ............ *H04L 69/30* (2013.01); *H04W 80/00* (2013.01)

(58) Field of Classification Search
CPC ............................... H04L 69/30; H04W 80/00
(Continued)

(56) References Cited

U.S. PATENT DOCUMENTS

| 6,937,158 B2* | 8/2005 | Lansford | H04B 1/713 370/344 |
| 7,596,353 B2* | 9/2009 | Chung | H04W 84/18 709/219 |

(Continued)

FOREIGN PATENT DOCUMENTS

| CN | 103975612 A | 8/2014 |
| CN | 104244170 A | 12/2014 |
| CN | 114365580 A | 4/2022 |

OTHER PUBLICATIONS

Maciej Nikodem et al., "Experimental Evaluation of Advertisement-Based Bluetooth Low Energy Communication", Sensors, Dec. 23, 2019. https://www.researchgate.net/publication/338127585_Experimental_Evaluation_of_Advertisement-Based_Bluetooth_Low_Energy_Communication.

(Continued)

*Primary Examiner* — Tauqir Hussain
(74) *Attorney, Agent, or Firm* — CKC & Partners Co., LLC (57) ABSTRACT

A Bluetooth internet protocol packet transmitting device and method are provided. The device includes a Bluetooth protocol stack, a Bluetooth controller and a host control interface. The Bluetooth protocol stack is configured to store an internet protocol stack and a host control interface driver. The Bluetooth controller generates at least one data packet based on an internet protocol packet, wherein the at least one data packet corresponds to an asynchronous connection data format. The Bluetooth controller transmits the at least one data packet to the host control interface driver. The host control interface driver determines whether the at least one data packet is an asynchronous connection data packet. When the host control interface driver determines that the at least one data packet is the asynchronous connection data (Continued)

packet, the at least one data packet is transmitted to the internet protocol stack.

18 Claims, 5 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 8,190,716 | B2* | 5/2012 | Zhodzishsky | H04L 63/0227 |
| | | | | 713/100 |
| 10,051,450 | B1* | 8/2018 | Malovany | H04W 4/80 |
| 10,141,974 | B2* | 11/2018 | Waxman | H04B 1/0475 |
| 11,799,750 | B1* | 10/2023 | Prasad | H04L 69/22 |
| 2002/0103942 | A1* | 8/2002 | Comeau | H04W 28/14 |
| | | | | 709/200 |
| 2003/0046413 | A1* | 3/2003 | Sakakura | H04W 40/02 |
| | | | | 709/229 |
| 2004/0100924 | A1* | 5/2004 | Yam | H04L 69/325 |
| | | | | 370/328 |
| 2005/0083741 | A1* | 4/2005 | Chang | H04L 63/0853 |
| | | | | 365/200 |
| 2006/0025075 | A1 | 2/2006 | Chung et al. | |
| 2007/0238483 | A1* | 10/2007 | Boireau | H04B 1/0057 |
| | | | | 455/553.1 |
| 2009/0034498 | A1* | 2/2009 | Banerjea | H04W 76/15 |
| | | | | 455/41.2 |
| 2011/0053507 | A1* | 3/2011 | Choi | H04W 88/06 |
| | | | | 455/41.2 |
| 2012/0257508 | A1 | 10/2012 | Reunamaki et al. | |
| 2014/0003409 | A1* | 1/2014 | Van De Laar | H04W 4/80 |
| | | | | 370/338 |
| 2016/0277522 | A1* | 9/2016 | Singh | H04W 4/80 |
| 2018/0184235 | A1* | 6/2018 | Wu | H04W 4/80 |
| 2023/0171028 | A1* | 6/2023 | Zhang | H03M 13/6519 |
| | | | | 370/310 |

OTHER PUBLICATIONS

"Bluetooth Core Specification" Bluetooth SIG, Inc., Jul. 13, 2021.
"Bluetooth Network Encapsulation Protocol (BNEP) Specification" Bluetooth SIG, Inc., Feb. 14, 2003.
"Dial-Up Networking Profile" Bluetooth SIG, Inc., Nov. 6, 2012.

* cited by examiner

BLUETOOTH INTERNET PROTOCOL PACKET TRANSMITTING DEVICE AND METHOD

CROSS-REFERENCE TO RELATED APPLICATION

This application claims priority to China Application Serial Number 202210802988.8, filed Jul. 7, 2022, which is herein incorporated by reference in its entirety.

BACKGROUND

Field of Invention

The present invention relates to a Bluetooth internet protocol packet transmitting device and method. More particularly, the present invention relates to a Bluetooth internet protocol packet transmitting device and method for reducing code spaces of the Bluetooth protocol stack.

Description of Related Art

In the existing Bluetooth network technology, since the internet protocol packet transmission requires the support of the complex Bluetooth protocol stack, the Bluetooth protocol stack needs to occupy a large amount of code space.

In addition, before the transmission of the internet protocol packet, the components inside the Bluetooth device need to be connected through the internet protocol first, thus consuming a lot of connection time cost and data transmission space, resulting in a burden on the Bluetooth device.

Accordingly, there is an urgent need for a Bluetooth internet protocol packet transmitting technology that can reduce the code space of the Bluetooth protocol stack.

SUMMARY

An objective of the present disclosure is to provide a Bluetooth internet protocol packet transmitting device. The Bluetooth internet protocol packet transmitting device comprises a Bluetooth protocol stack, a Bluetooth controller, and a host control interface. The host control interface device is electrically connected to the Bluetooth protocol stack and the Bluetooth controller. The Bluetooth protocol stack is configured to store an internet protocol stack and a host control interface driver. The Bluetooth controller generates at least one data packet based on an internet protocol packet, wherein the at least one data packet corresponds to an asynchronous connection data format. The Bluetooth controller transmits the at least one data packet to the host control interface driver. The host control interface driver determines whether the at least one data packet is an asynchronous connection data packet. The host control interface transmit the at least one data packet to the internet protocol stack when the host control interface driver determines that the at least one data packet is the asynchronous connection data packet.

Another objective of the present disclosure is to provide a Bluetooth internet protocol packet transmitting method, which is adapted for use in an electronic device. The electronic device comprises a Bluetooth protocol stack, a Bluetooth controller, and a host control interface. The host control interface is electrically connected to the Bluetooth protocol stack and the Bluetooth controller. The Bluetooth protocol stack is configured to store an internet protocol stack and a host control interface driver. The Bluetooth internet protocol packet transmitting method comprises the following steps: generating, by the Bluetooth controller, at least one data packet based on an internet protocol packet, wherein the at least one data packet corresponds to an asynchronous connection data format; transmitting, by the Bluetooth controller, the at least one data packet to the host control interface driver; determining, by the host control interface driver, whether the at least one data packet is an asynchronous connection data packet; and transmitting, by the host control interface, the at least one data packet to the internet protocol stack when the host control interface driver determines that the at least one data packet is the asynchronous connection data packet.

According to the above descriptions, the Bluetooth internet protocol packet transmitting technology (at least including the device and method) provided by the present disclosure converts the internet protocol packet to an asynchronous connection data format through the Bluetooth controller, and directly transmits the internet protocol packet to the internet protocol stack through the host control interface driver. In addition, for some devices that still need to support standard Bluetooth applications, the Bluetooth internet protocol packet transmitting technology provided by the present disclosure can also transmit the data packets corresponding to the agreed channel to the internet protocol stack through the host control interface driver and the logical link control and adaptation protocol, and transmit other packets to the corresponding original Bluetooth protocol stack. Since the Bluetooth internet protocol packet transmitting technology provided by the present disclosure can transmit the internet protocol packet without going through complicated internet protocol connection procedures, it can reduce the code space of the Bluetooth protocol stack of the Bluetooth device and the burden of Bluetooth devices on connection time cost and data transmission space.

The detailed technology and preferred embodiments implemented for the subject disclosure are described in the following paragraphs accompanying the appended drawings for people skilled in this field to well appreciate the features of the claimed disclosure.

DETAILED DESCRIPTION

In the following description, a Bluetooth internet protocol packet transmitting device and method according to the present disclosure will be explained with reference to embodiments thereof. However, these embodiments are not intended to limit the present disclosure to any environment, applications, or implementations described in these embodiments. Therefore, the description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
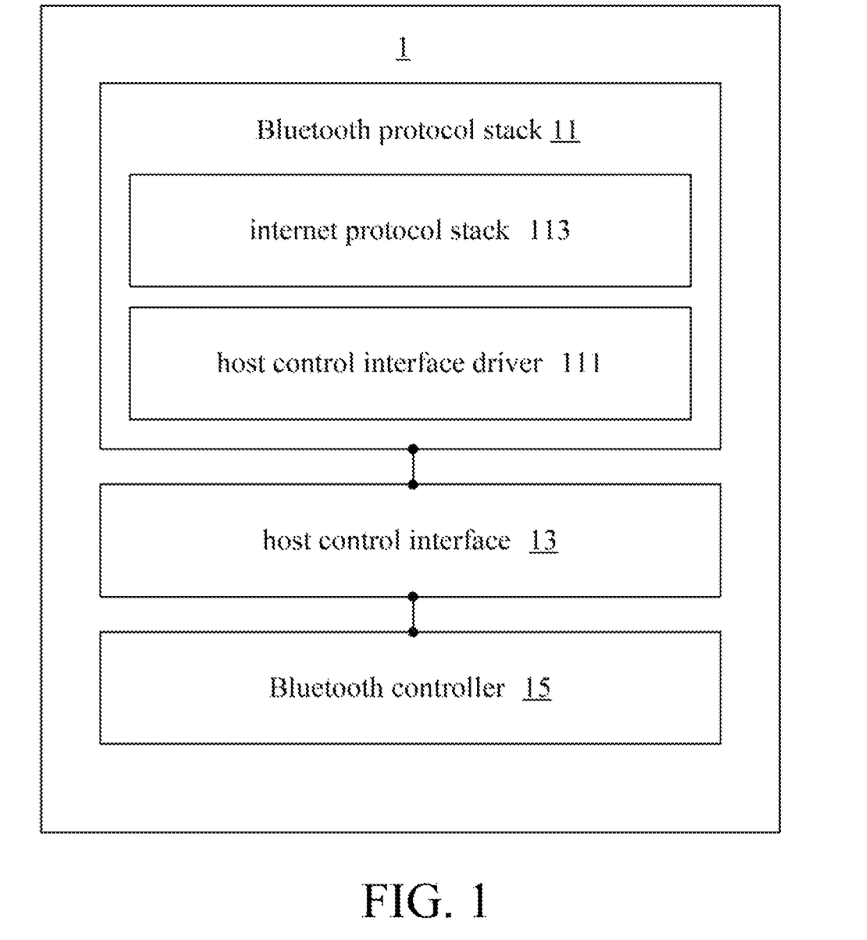
FIG. 1 is a schematic diagram depicting a Bluetooth internet protocol packet transmitting device of the first embodiment.

The first embodiment of the present disclosure is a Bluetooth internet protocol packet transmitting device 1, and its schematic diagram is depicted in FIG. 1. The Bluetooth internet protocol packet transmitting device 1 comprises a Bluetooth protocol stack 11, a Bluetooth controller 15, and a host control interface 13. The host control interface 13 is electrically connected to the Bluetooth protocol stack 11 and the Bluetooth controller 15.

It shall be appreciated that the Bluetooth protocol stack 11 is configured to store a plurality of protocol stacks supported by the Bluetooth technology.

For example, the Bluetooth protocol stack 11 may store Bluetooth Network Encapsulation Protocol (BNEP), dial-up networking (DUN) protocol, radio frequency communication (RFCOMM) protocol, Bluetooth Manager, Service Discovery Protocol (SDP), Logical Link Control and Adaptation Protocol (L2CAP), Internet Protocol stack, host Control interface (HCl) driver.

In the present embodiment, as shown in FIG. 1, the Bluetooth protocol stack 11 stores the internet protocol stack 113 and the host control interface driver 111.

It shall be appreciated that the Bluetooth internet protocol packet transmitting device 1 also comprises necessary elements for performing other operations, such as an application layer. However, the technical features of the present disclosure focus on the Bluetooth internet protocol packet transmission, so it is not specifically shown in the present disclosure.

It shall be appreciated that the host control interface 13 is an interface for receiving and transmitting data between the Bluetooth controller 15 and the Bluetooth protocol stack 11. Specifically, the host control interface 13 may transmit data types such as command packets, asynchronous connection-oriented link (ACL) data packets, synchronous connection-oriented (SCO) data packets, events, etc.

It shall be appreciated that the Bluetooth controller 15 may be used to process packets of commands, data or events received from outside or inside the Bluetooth device. The Bluetooth controller 15 may be implemented by a Bluetooth chip (e.g., BR/EDR chip, LE chip) or other computing devices known to those skilled in the art of the present disclosure.

In the present embodiment, the Bluetooth controller 15 may convert the received internet protocol packet into a packet with an asynchronous connection data format (i.e., an ACL data packet), and then execute subsequent transmission. Specifically, the Bluetooth controller 15 generates at least one data packet based on an internet protocol packet, wherein the at least one data packet corresponds to an asynchronous connection data format. The asynchronous connection data format corresponds to the host control interface 13.

Next, the Bluetooth controller 15 transmits the at least one data packet to the host control interface driver 111. Specifically, the Bluetooth controller 15 may transmit the at least one data packet to the host control interface driver 111 in the Bluetooth protocol stack 11 through the host control interface 13.

It shall be appreciated that since the Bluetooth controller 15 is transmitted through the data transmission format supported by the host control interface 13 (i.e., the asynchronous connection data format), there is no need to pre-connect through complex Bluetooth protocol stacks (such as internet protocols) before transmitting data.

Subsequently, the host control interface driver 111 determines whether the at least one data packet is an asynchronous connection data packet. For example, the host control interface driver 111 may determine whether it is an asynchronous connection data packet by determining whether the at least one data packet has a data format corresponding to the asynchronous connection data format.

Finally, the host control interface driver 111 transmits the at least one data packet to the internet protocol stack 113 when the host control interface driver 111 determines that the at least one data packet is the asynchronous connection data packet.

In some embodiments, since the size of an internet protocol packet is generally larger than that of an asynchronous connection data packet, data transmission cannot be performed through a single asynchronous connection data packet. Therefore, the Bluetooth controller 15 may divide an internet protocol packet into a plurality of data segments to convert into a plurality of asynchronous connection data packets.

Specifically, the Bluetooth controller 15 may split the internet protocol packet into multiple asynchronous connection data packets for transmission through the packet boundary flag in the asynchronous connection data format, and then the combined operation is performed through the host control interface driver.

Figure 2:
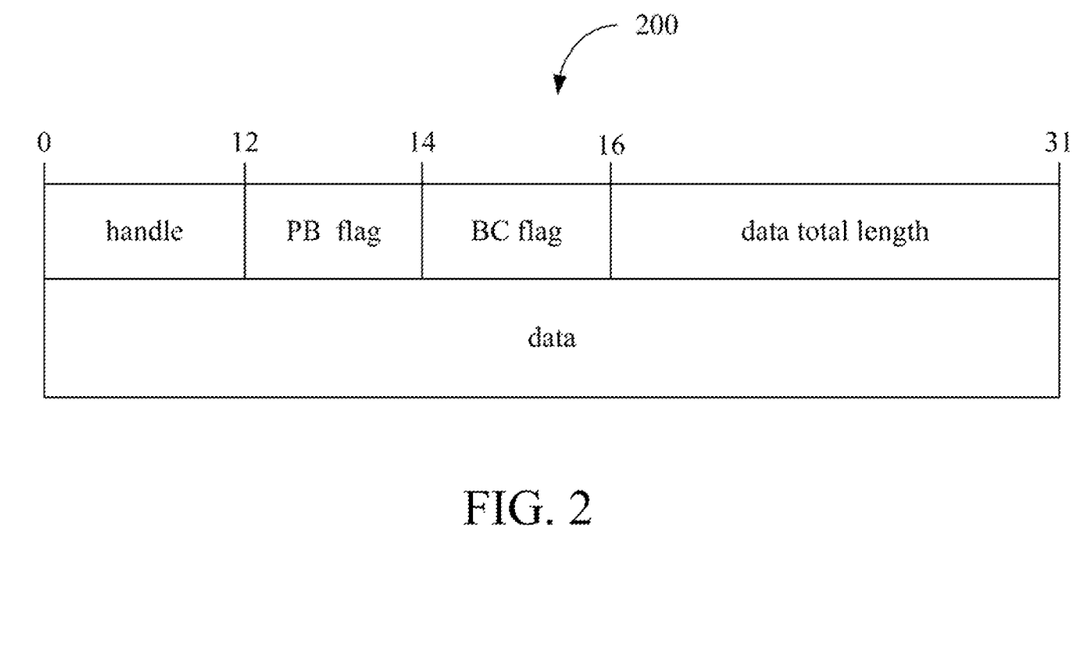
FIG. 2 is a schematic diagram depicting a asynchronous connection data format of the first embodiment.

For ease of understanding, please refer to FIG. 2. FIG. 2 is a schematic diagram depicting an asynchronous connection data format 200. The fields of the asynchronous connection data format 200 comprise handle, packet boundary (PB) flag, broadcast (BC) flag, and data total length corresponding to different bit positions.

For example, the Bluetooth controller 15 may mark the sequence of the data segments of the internet protocol packet based on the 2-bit packet boundary flag (i.e., PB Flag) in the asynchronous connection data format. Specifically, when segmenting the data segments of the internet protocol packet, the Bluetooth controller 15 may set the bit value of the packet boundary flag corresponding to the first segment asynchronous connection data packet to "00" and "10". The Bluetooth controller 15 sets the packet boundary flag bit values corresponding to other subsequent asynchronous connection data packets to "01". In addition, for a packet with a small amount of data (i.e., a packet that can be transmitted in a single transmission), the Bluetooth controller 15 may set the bit value of the packet boundary flag corresponding to the complete asynchronous connection data packet to "11".

Specifically, the Bluetooth controller 15 segments the internet protocol packet to generate the at least one data packet based on a packet boundary flag in the asynchronous connection data format, wherein each of the at least one data packet corresponds to a data segment of the internet protocol packet. Next, the host control interface driver 111 combines the at least one data packet to transmit to the internet protocol stack 113 based on the packet boundary flag corresponding to each of the at least one data packet.

In some embodiments, since the packet of the asynchronous connection data format corresponds to a data packet size, each of the data segments must conform to the packet size of the asynchronous connection data format.

In some embodiments, due to the consideration that some Bluetooth devices need to support standard Bluetooth applications at the same time, it is necessary to retain the original protocol stack so that the Bluetooth device can transmit internet protocol packets (e.g., IPV4, IPV6 packet data) and other packets based on the logical link control and adaptation protocol (L2CAP).

Figure 3:
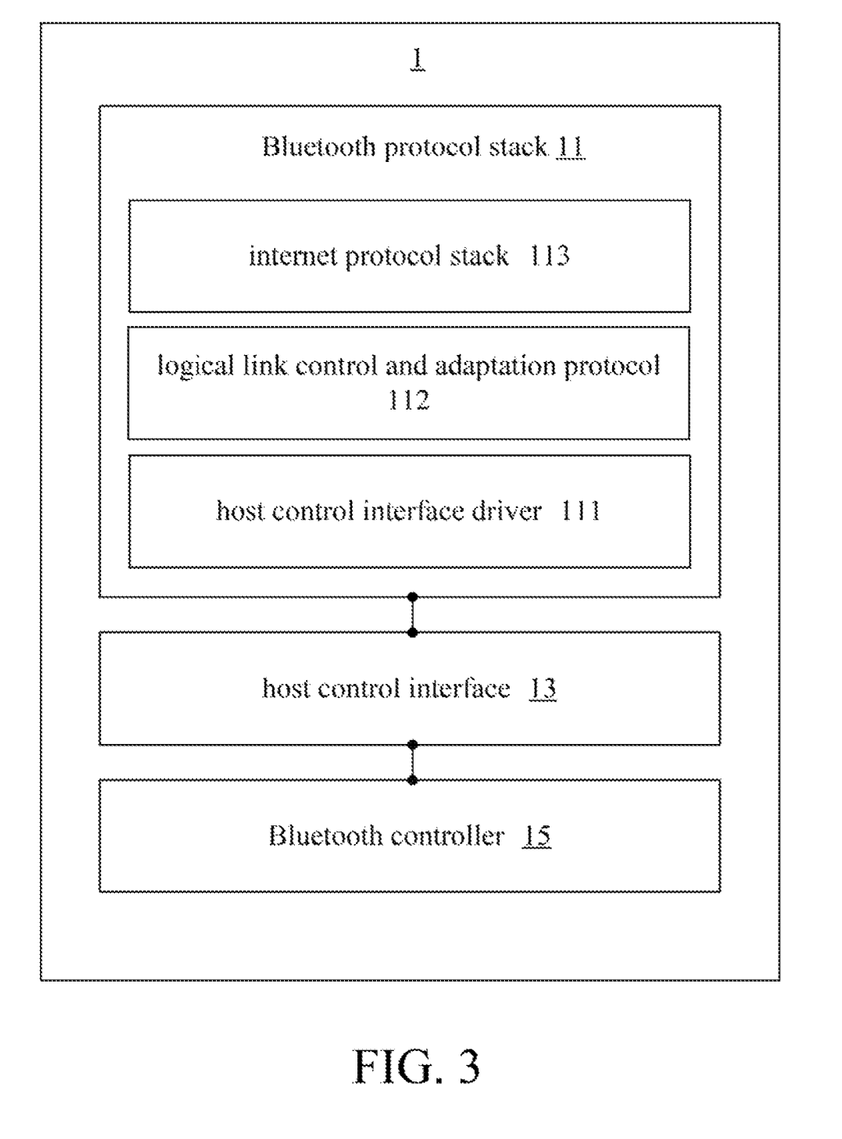
FIG. 3 is a schematic diagram depicting a Bluetooth internet protocol packet transmitting device in some embodiments.

Therefore, as shown in FIG. 3, in some embodiments, the Bluetooth protocol stack 11 in the Bluetooth internet protocol packet transmitting device 1 of the present disclosure further stores a logical link control and adaptation protocol 112. Specifically, the host control interface driver 111 transmits the at least one data packet to the internet protocol stack 113 through the logical link control and adaptation protocol 112 when the host control interface driver 111 determines that the at least one data packet is the asynchronous connection data packet.

Specifically, the host control interface driver 111 may convert the at least one data packet into a packet format corresponding to the logical link control and adaptation protocol 112, and then transmit it to the internet protocol stack 113 through the logical link control and adaptation protocol 112.

In some embodiments, the logical link control and adaptation protocol 112 has a plurality of different channels, each channel has a corresponding Bluetooth protocol stack to support a plurality of different Bluetooth protocols. Since the internet protocol packet may operate on one or more channels of the logical link control and adaptation protocol 112, by setting at least one agreed channel, the logical link control and adaptation protocol 112 may transmit the data belonging to the agreed channel to the internet protocol stack, so as to speed up the transmission time of the packet.

Specifically, the logical link control and adaptation protocol 112 determines whether the at least one data packet corresponds to at least one agreed channel. Next, the logical link control and adaptation protocol 112 transmits the at least one data packet to the internet protocol stack 113 when the logical link control and adaptation protocol 112 determines that the at least one data packet corresponds to the at least one agreed channel.

In addition, in some embodiments, the logical link control and adaptation protocol 112 transmits the packet data of other channels (i.e., not belonging to the agreed channel) to the original corresponding Bluetooth protocol stack. For example, please refer to FIG. 4, the Bluetooth protocol stack 11 in the Bluetooth internet protocol packet transmitting device 1 of the present disclosure further stores other Bluetooth protocol stacks 115 (e.g., Bluetooth network encapsulation protocol, dial-up network protocol, radio frequency communication protocols, service discovery protocol, etc.).

Figure 4:
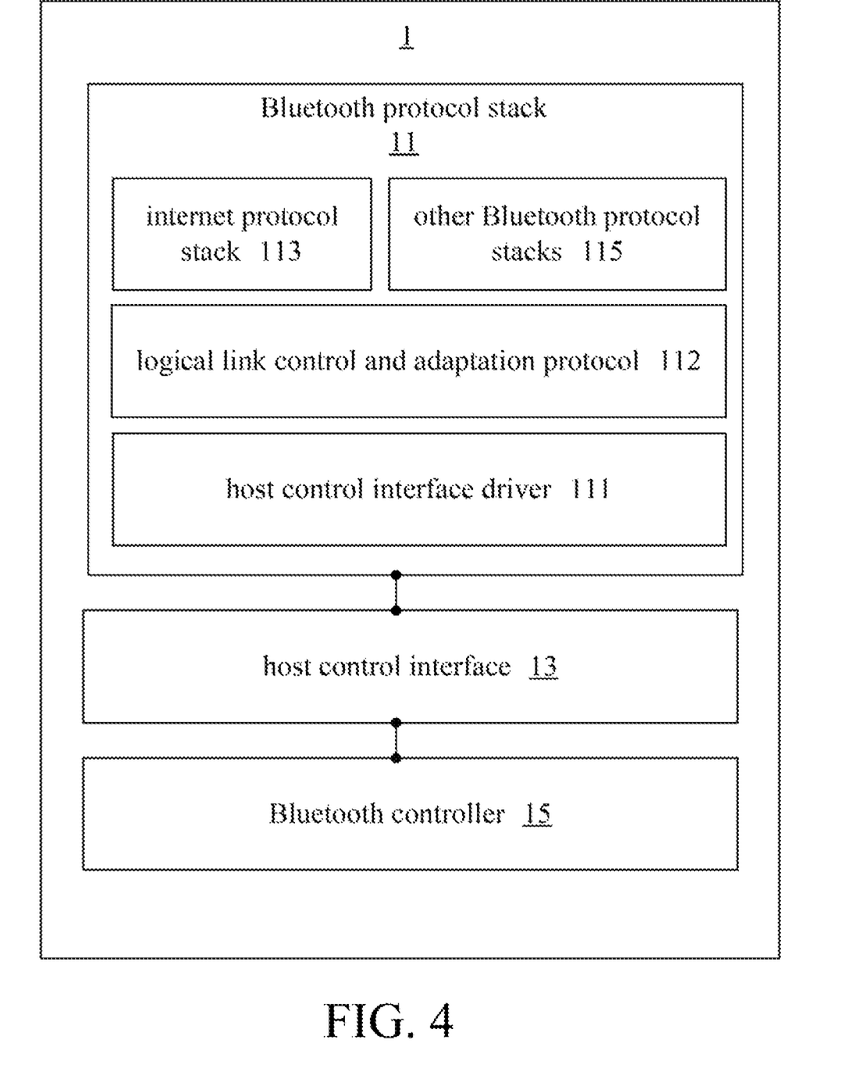
FIG. 4 is a schematic diagram depicting a Bluetooth internet protocol packet transmitting device in some embodiments.

Specifically, the Bluetooth protocol stack 11 further stores a first Bluetooth protocol (e.g., Bluetooth network encapsulation protocol, dial-up network protocol, radio frequency communication protocols, service discovery protocol, etc.), and the first Bluetooth protocol corresponds to a first channel. The logical link control and adaptation protocol 112 determines whether the at least one data packet corresponds to the first channel. The logical link control and adaptation protocol 112 transmits the at least one data packet to the first Bluetooth protocol when the logical link control and adaptation protocol 112 determines that the at least one data packet corresponds to the first channel.

In some embodiments, when the size of the internet protocol packet is large, in order to meet the data amount of the transmission packet, the maximum transmission unit (MTU) of the logical link control and adaptation protocol 112 can be adjusted to transmit data packets. Specifically, the logical link control and adaptation protocol 112 determines a maximum transmission unit based on a negotiation mechanism. Next, the logical link control and adaptation protocol 112 transmits the at least one data packet to the internet protocol stack 113 based on the maximum transmission unit.

In some embodiments, in the case of having the logical link control and adaptation protocol 112, the internet protocol packet may be segmented into multiple asynchronous connection data packets for transmission through the packet boundary flag based on the aforementioned asynchronous connection data format, and then the host control interface driver 111 may perform the combining operation. Specifically, the host control interface driver 111 transmits the at least one data packet after combining to the internet protocol stack 113 through the logical link control and adaptation protocol 112 when the host control interface driver 111 determines that the at least one data packet is the asynchronous connection data packet.

In some embodiments, the internet protocol packet is segmented into multiple asynchronous connection data packets for transmission, and the maximum transmission unit of the logical link control and adaptation protocol 112 can also be adjusted to transmit the data packets. Specifically, the logical link control and adaptation protocol 112 determines a maximum transmission unit based on a negotiation mechanism. Next, the logical link control and adaptation protocol 112 transmits the at least one data packet after combining (i.e., the combined at least one data packet) to the internet protocol stack 113 based on the maximum transmission unit.

In some embodiments, due to the limited bandwidth of Bluetooth, in order to save the amount of transmitted data, a compression operation can be performed on the header data position of the internet protocol (i.e., IP, TCP, UDP, ICMP, and IGMP) packet in different ways.

For example, a compression algorithm can be used to directly perform compression operations on the position of the header data. For another example, if the packet does not need to provide the content of Quality of Service (Qos) or Type of Service (Tos), the relevant field position may not be transmitted.

In addition, if both the transmitting end and the receiving end can know part of the data segment, then repeated transmission may not be required. For example, if the receiving end and the transmitting end are in the same subnet, the internet protocol packet only needs to transmit the difference part, and does not need to completely fill in the source network address and destination network address.

In addition, some data fields do not require many data bits to represent, so the data fields can also be compressed. For example, since the current internet protocol only supports two versions, IPV4 and IPV6, and the header data position of the original internet protocol stack is represented by 4 bits, it can be compressed into 1 bit.

As can be seen from the above description, the Bluetooth internet protocol packet transmitting device 1 converts the internet protocol packet to an asynchronous connection data format through the Bluetooth controller, and directly transmits the internet protocol packet to the internet protocol stack through the host control interface driver. In addition, for some devices that still need to support standard Bluetooth applications, the Bluetooth internet protocol packet driver device 1 provided by the present disclosure can also transmit the data packets corresponding to the agreed channel to the internet protocol stack through the host control interface driver and the logical link control and adaptation protocol, and transmit other packets to the corresponding original Bluetooth protocol stack. Since the Bluetooth internet protocol packet transmitting device 1 provided by the present disclosure can transmit the internet protocol packet without going through complicated internet protocol connection procedures, it can reduce the code space of the Bluetooth protocol stack of the Bluetooth device and the burden of Bluetooth devices on connection time cost and data transmission space.

Figure 5:
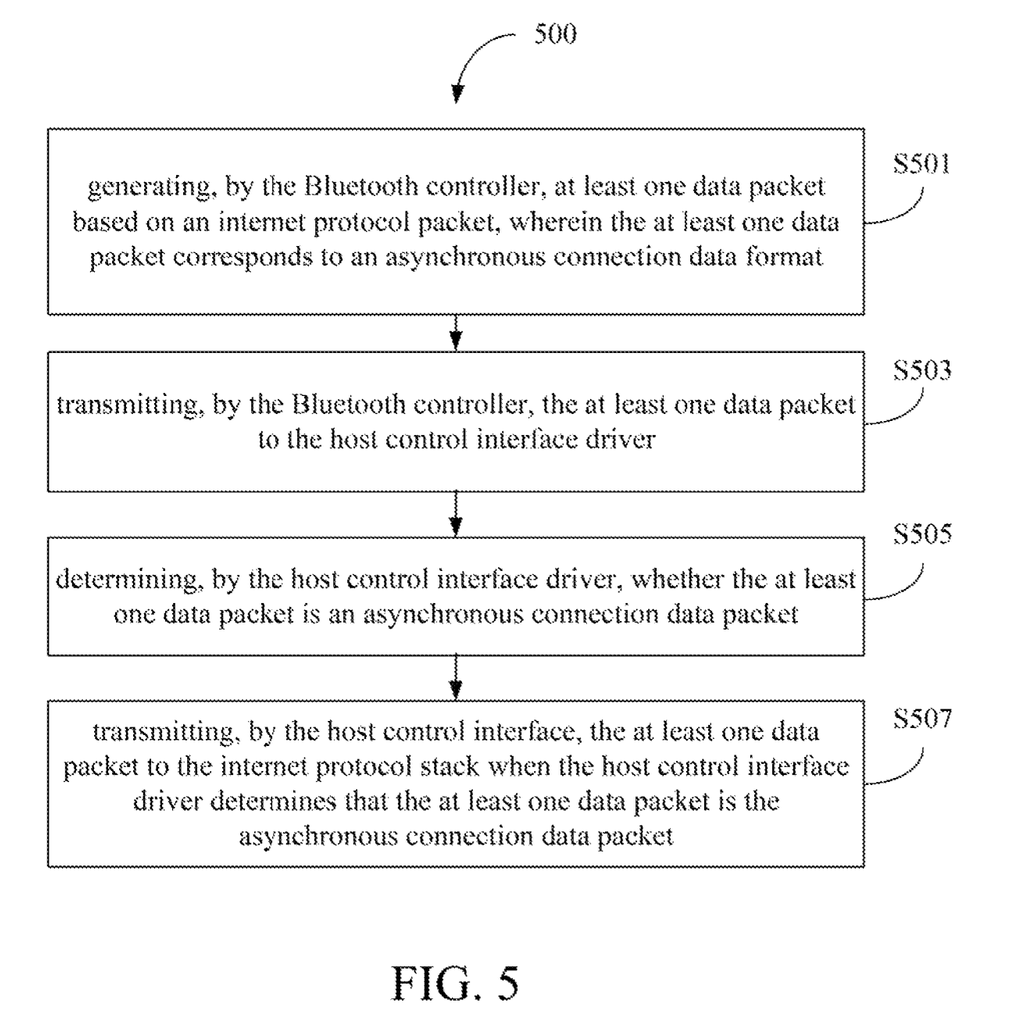
FIG. 5 is a partial flowchart depicting the Bluetooth internet protocol packet transmitting method of the second embodiment.

A second embodiment of the present disclosure is a Bluetooth internet protocol packet transmitting method and a flowchart thereof is depicted in FIG. 5. The Bluetooth internet protocol packet transmitting method 500 is adapted for an electronic device (e.g., the Bluetooth internet protocol packet transmitting device 1 of the first embodiment). The electronic device comprises a Bluetooth protocol stack, a Bluetooth controller, and a host control interface (e.g., the Bluetooth protocol stack 11, the Bluetooth controller 15, and the host control interface 13 of the first embodiment). The host control interface is electrically connected to the Bluetooth protocol stack and the Bluetooth controller. The Bluetooth protocol stack is configured to store an internet protocol stack and a host control interface driver (e.g., the internet protocol stack 113 and a host control interface driver 111 of the first embodiment). The Bluetooth internet protocol packet transmitting method 500 transmits the internet protocol packet through steps S501 to S507.

In the step S501, the Bluetooth controller generates at least one data packet based on an internet protocol packet, wherein the at least one data packet corresponds to an asynchronous connection data format. Next, in the step S503, the Bluetooth controller transmits the at least one data packet to the host control interface driver.

Next, in the step S505, the host control interface driver determines whether the at least one data packet is an asynchronous connection data packet. Next, in the step S507, the host control interface transmits the at least one data packet to the internet protocol stack when the host control interface driver determines that the at least one data packet is the asynchronous connection data packet.

In some embodiments, the Bluetooth internet protocol packet transmitting method 500 further comprises the following steps: segmenting, by the Bluetooth controller, the internet protocol packet to generate the at least one data packet based on a packet boundary flag in the asynchronous connection data format, wherein each of the at least one data packet corresponds to a data segment of the internet protocol packet; and combining, by the host control interface driver, the at least one data packet to transmit to the internet protocol stack based on the packet boundary flag corresponding to each of the at least one data packet.

In some embodiments, wherein the Bluetooth protocol stack further stores a logical link control and adaptation protocol, and Bluetooth internet protocol packet transmitting method 500 further comprises the following steps: transmitting the at least one data packet after combining to the internet protocol stack through the logical link control and adaptation protocol when the host control interface driver determines that the at least one data packet is the asynchronous connection data packet.

In some embodiments, wherein the Bluetooth internet protocol packet transmitting method 500 further comprises the following steps: determining, by the logical link control and adaptation protocol, a maximum transmission unit based on a negotiation mechanism; and transmitting, by the logical link control and adaptation protocol, the at least one data packet after combining to the internet protocol stack based on the maximum transmission unit.

In some embodiments, wherein each of the data segments conforms to a packet size of the asynchronous connection data format.

In some embodiments, the Bluetooth protocol stack further stores a logical link control and adaptation protocol, and the Bluetooth internet protocol packet transmitting method 500 further comprises the following steps: transmitting, by the host control interface driver, the at least one data packet to the internet protocol stack through the logical link control and adaptation protocol when the host control interface driver determines that the at least one data packet is the asynchronous connection data packet.

In some embodiments, the Bluetooth internet protocol packet transmitting method 500 further comprises the following steps: determining, by the logical link control and adaptation protocol, whether the at least one data packet corresponds to at least one agreed channel; and transmitting the at least one data packet to the internet protocol stack when the logical link control and adaptation protocol determines that the at least one data packet corresponds to the at least one agreed channel.

In some embodiments, the Bluetooth protocol stack further stores a first Bluetooth protocol, the first Bluetooth protocol corresponds to a first channel, and the Bluetooth internet protocol packet transmitting method 500 further comprises the following steps: determining, by the logical link control and adaptation protocol, whether the at least one data packet corresponds to the first channel; and transmitting the at least one data packet to the first Bluetooth protocol when the logical link control and adaptation protocol determines that the at least one data packet corresponds to the first channel.

In some embodiments, the Bluetooth internet protocol packet transmitting method 500 further comprises the following steps: determining, by the logical link control and adaptation protocol, a maximum transmission unit based on a negotiation mechanism; and transmitting, by the logical link control and adaptation protocol, the at least one data packet to the internet protocol stack based on the maximum transmission unit.

In some embodiments, the Bluetooth internet protocol packet transmitting method 500 further comprises the following steps: executing, the Bluetooth controller, a compression operation on a header data position of the internet protocol packet.

In addition to the aforesaid steps, the second embodiment can also execute all the operations and steps of the Bluetooth internet protocol packet transmitting device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the Bluetooth protocol, the channel) are preceded by terms such as "first", and these terms of "first" are only used to distinguish these different words. For example, the "first" of the first Bluetooth protocol is only used to indicate one of the Bluetooth protocols.

According to the above descriptions, the Bluetooth internet protocol packet transmitting technology (at least including the device and method) provided by the present disclosure converts the internet protocol packet to an asynchronous connection data format through the Bluetooth controller, and directly transmits the internet protocol packet to the internet protocol stack through the host control interface driver. In addition, for some devices that still need to support standard Bluetooth applications, the Bluetooth internet protocol packet transmitting technology provided by the present disclosure can also transmit the data packets corresponding to the agreed channel to the internet protocol stack through the host control interface driver and the logical link control and adaptation protocol, and transmit other packets to the corresponding original Bluetooth protocol stack. Since the Bluetooth internet protocol packet transmitting technology provided by the present disclosure can transmit the internet protocol packet without going through complicated internet protocol connection procedures, it can reduce the code space of the Bluetooth protocol stack of the Bluetooth device and the burden of Bluetooth devices on connection time cost and data transmission space.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A Bluetooth internet protocol packet transmitting device, comprising:
    a Bluetooth protocol stack, being configured to store an internet protocol stack and a host control interface driver;
    a Bluetooth controller; and
    a host control interface, being electrically connected to the Bluetooth protocol stack and the Bluetooth controller;
    wherein the Bluetooth internet protocol packet transmitting device executes the following operations:
    generating, by the Bluetooth controller, at least one data packet based on an internet protocol packet, wherein the at least one data packet corresponds to an asynchronous connection data format, the Bluetooth controller segments the internet protocol packet to generate the at least one data packet based on a packet boundary flag in the asynchronous connection data format, and each of the at least one data packet corresponds to a data segment of the internet protocol packet;
    transmitting, by the Bluetooth controller, the at least one data packet to the host control interface driver;
    determining, by the host control interface driver, whether the at least one data packet is an asynchronous connection data packet; and
    transmitting, by the host control interface driver, the at least one data packet to the internet protocol stack when the host control interface driver determines that the at least one data packet is the asynchronous connection data packet, wherein the host control interface driver combines the at least one data packet to transmit to the internet protocol stack based on the packet boundary flag corresponding to each of the at least one data packet.

2. The Bluetooth internet protocol packet transmitting device of claim 1, wherein each of the data segments conforms to a packet size of the asynchronous connection data format.

3. The Bluetooth internet protocol packet transmitting device of claim 1, wherein the Bluetooth protocol stack further stores a logical link control and adaptation protocol, and the Bluetooth internet protocol packet transmitting device executes the following operations:
    transmitting, by the host control interface driver, the at least one data packet to the internet protocol stack through the logical link control and adaptation protocol when the host control interface driver determines that the at least one data packet is the asynchronous connection data packet.

4. The Bluetooth internet protocol packet transmitting device of claim 3, wherein the Bluetooth internet protocol packet transmitting device further executes the following operations:
    determining, by the logical link control and adaptation protocol, whether the at least one data packet corresponds to at least one agreed channel; and
    transmitting the at least one data packet to the internet protocol stack when the logical link control and adaptation protocol determines that the at least one data packet corresponds to the at least one agreed channel.

5. The Bluetooth internet protocol packet transmitting device of claim 3, wherein the Bluetooth protocol stack further stores a first Bluetooth protocol, the first Bluetooth protocol corresponds to a first channel, and the Bluetooth internet protocol packet transmitting device further executes the following operations:
    determining, by the logical link control and adaptation protocol, whether the at least one data packet corresponds to the first channel; and
    transmitting the at least one data packet to the first Bluetooth protocol when the logical link control and adaptation protocol determines that the at least one data packet corresponds to the first channel.

6. The Bluetooth internet protocol packet transmitting device of claim 3, wherein the Bluetooth internet protocol packet transmitting device further executes the following operations:
    determining, by the logical link control and adaptation protocol, a maximum transmission unit based on a negotiation mechanism; and
    transmitting, by the logical link control and adaptation protocol, the at least one data packet to the internet protocol stack based on the maximum transmission unit.

7. The Bluetooth internet protocol packet transmitting device of claim 1, wherein the Bluetooth protocol stack further stores a logical link control and adaptation protocol, and executes the following operations:
    transmitting the at least one data packet after combining to the internet protocol stack through the logical link control and adaptation protocol when the host control interface driver determines that the at least one data packet is the asynchronous connection data packet.

8. The Bluetooth internet protocol packet transmitting device of claim 7, wherein the Bluetooth internet protocol packet transmitting device further executes the following operations:
determining, by the logical link control and adaptation protocol, a maximum transmission unit based on a negotiation mechanism; and
transmitting, by the logical link control and adaptation protocol, the at least one data packet after combining to the internet protocol stack based on the maximum transmission unit.

9. The Bluetooth internet protocol packet transmitting device of claim 1, wherein the Bluetooth internet protocol packet transmitting device further executes the following operations:
executing, the Bluetooth controller, a compression operation on a header data position of the internet protocol packet.

10. A Bluetooth internet protocol packet transmitting method, being adapted for use in in an electronic device, wherein the electronic device comprises a Bluetooth protocol stack, a Bluetooth controller, and a host control interface, the host control interface is electrically connected to the Bluetooth protocol stack and the Bluetooth controller, the Bluetooth protocol stack is configured to store an internet protocol stack and a host control interface driver, and the Bluetooth internet protocol packet transmitting method comprises the following steps:
generating, by the Bluetooth controller, at least one data packet based on an internet protocol packet, wherein the at least one data packet corresponds to an asynchronous connection data format, the Bluetooth controller segments the internet protocol packet to generate the at least one data packet based on a packet boundary flag in the asynchronous connection data format, and each of the at least one data packet corresponds to a data segment of the internet protocol packet;
transmitting, by the Bluetooth controller, the at least one data packet to the host control interface driver;
determining, by the host control interface driver, whether the at least one data packet is an asynchronous connection data packet; and
transmitting, by the host control interface driver, the at least one data packet to the internet protocol stack when the host control interface driver determines that the at least one data packet is the asynchronous connection data packet, wherein the host control interface driver combines the at least one data packet to transmit to the internet protocol stack based on the packet boundary flag corresponding to each of the at least one data packet.

11. The Bluetooth internet protocol packet transmitting method of claim 10, wherein each of the data segments conforms to a packet size of the asynchronous connection data format.

12. The Bluetooth internet protocol packet transmitting method of claim 10, wherein the Bluetooth protocol stack further stores a logical link control and adaptation protocol, and the Bluetooth internet protocol packet transmitting method further comprises the following steps:
transmitting, by the host control interface driver, the at least one data packet to the internet protocol stack through the logical link control and adaptation protocol when the host control interface driver determines that the at least one data packet is the asynchronous connection data packet.

13. The Bluetooth internet protocol packet transmitting method of claim 12, wherein the Bluetooth internet protocol packet transmitting method further comprises the following steps:
determining, by the logical link control and adaptation protocol, whether the at least one data packet corresponds to at least one agreed channel; and
transmitting the at least one data packet to the internet protocol stack when the logical link control and adaptation protocol determines that the at least one data packet corresponds to the at least one agreed channel.

14. The Bluetooth internet protocol packet transmitting method of claim 12, wherein the Bluetooth protocol stack further stores a first Bluetooth protocol, the first Bluetooth protocol corresponds to a first channel, and the Bluetooth internet protocol packet transmitting method further comprises the following steps:
determining, by the logical link control and adaptation protocol, whether the at least one data packet corresponds to the first channel; and
transmitting the at least one data packet to the first Bluetooth protocol when the logical link control and adaptation protocol determines that the at least one data packet corresponds to the first channel.

15. The Bluetooth internet protocol packet transmitting method of claim 12, wherein the Bluetooth internet protocol packet transmitting method further comprises the following steps:
determining, by the logical link control and adaptation protocol, a maximum transmission unit based on a negotiation mechanism; and
transmitting, by the logical link control and adaptation protocol, the at least one data packet to the internet protocol stack based on the maximum transmission unit.

16. The Bluetooth internet protocol packet transmitting method of claim 10, wherein the Bluetooth protocol stack further stores a logical link control and adaptation protocol, and the Bluetooth internet protocol packet transmitting method further comprises the following steps:
transmitting the at least one data packet after combining to the internet protocol stack through the logical link control and adaptation protocol when the host control interface driver determines that the at least one data packet is the asynchronous connection data packet.

17. The Bluetooth internet protocol packet transmitting method of claim 16, wherein the Bluetooth internet protocol packet transmitting method further comprises the following steps:
determining, by the logical link control and adaptation protocol, a maximum transmission unit based on a negotiation mechanism; and
transmitting, by the logical link control and adaptation protocol, the at least one data packet after combining to the internet protocol stack based on the maximum transmission unit.

18. The Bluetooth internet protocol packet transmitting method of claim 10, wherein the Bluetooth internet protocol packet transmitting method further comprises following steps:
executing, the Bluetooth controller, a compression operation on a header data position of the internet protocol packet.

* * * * *